United States Patent
Su et al.

(10) Patent No.: US 9,549,207 B2
(45) Date of Patent: Jan. 17, 2017

(54) BACKWARD-COMPATIBLE CODING FOR ULTRA HIGH DEFINITION VIDEO SIGNALS WITH ENHANCED DYNAMIC RANGE

(71) Applicant: Dolby Laboratories Licensing Corporation, San Francisco, CA (US)

(72) Inventors: Guan-Ming Su, Fremont, CA (US); Robin Atkins, Campbell, CA (US); Qian Chen, San Jose, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 53 days.

(21) Appl. No.: 14/758,780

(22) PCT Filed: Dec. 4, 2013

(86) PCT No.: PCT/US2013/073085
§ 371 (c)(1),
(2) Date: Jun. 30, 2015

(87) PCT Pub. No.: WO2014/107255
PCT Pub. Date: Jul. 10, 2014

(65) Prior Publication Data
US 2015/0341675 A1    Nov. 26, 2015

Related U.S. Application Data

(60) Provisional application No. 61/748,411, filed on Jan. 2, 2013, provisional application No. 61/821,173, filed
(Continued)

(51) Int. Cl.
*H04N 19/98* (2014.01)
*H04N 19/186* (2014.01)
(Continued)

(52) U.S. Cl.
CPC ............ *H04N 19/98* (2014.11); *H04N 19/105* (2014.11); *H04N 19/117* (2014.11);
(Continued)

(58) Field of Classification Search
CPC .. H04N 19/105; H04N 19/117; H04N 19/136; H04N 19/17; H04N 19/179; H04N 19/186; H04N 19/33; H04N 19/53; H04N 19/98
(Continued)

(56) References Cited

U.S. PATENT DOCUMENTS 4,125,856 A * 11/1978 Netravali ............. H04N 19/593
375/240.25
4,141,034 A * 2/1979 Netravali ............. H04N 11/046
375/240.14
(Continued)

FOREIGN PATENT DOCUMENTS

CN    101568036    10/2009
CN    101589625    11/2009
(Continued)

OTHER PUBLICATIONS

Zhao, M. et al "Content-Adaptive up-Scaling of Chrominance Using Classification of Luminance and Chrominance Data" Electronic Imaging International Society for Optics and Photonics, 2004.
(Continued)

*Primary Examiner* — Francis G Geroleo

(57) ABSTRACT

Video data with both ultra-high definition (UHD) resolution and high or enhanced dynamic range (EDR) data are coded in a backward-compatible layered stream which allows legacy decoders to extract an HD standard dynamic range (SDR) signal. In response to a base layer HD SDR signal, a predicted signal is generated using separate luma and
(Continued)

chroma prediction models. In the luma predictor, luma pixel values of the predicted signal are computed based only on luma pixel values of the base layer, while in the chroma predictor, chroma pixel values of the predicted signal are computed based on both the luma and the chroma pixel values of the base layer. A residual signal is computed based on the input UHD EDR signal and the predicted signal. The base layer and the residual signal are coded separately to form a coded bitstream. A compatible dual-layer decoder is also presented.

15 Claims, 5 Drawing Sheets

Related U.S. Application Data on May 8, 2013, provisional application No. 61/882,773, filed on Sep. 26, 2013.

(51) Int. Cl.
| | |
|---|---|
| H04N 19/33 | (2014.01) |
| H04N 19/53 | (2014.01) |
| H04N 19/179 | (2014.01) |
| H04N 19/105 | (2014.01) |
| H04N 19/117 | (2014.01) |
| H04N 19/136 | (2014.01) |
| H04N 19/17 | (2014.01) |

(52) U.S. Cl.
CPC ........... *H04N 19/136* (2014.11); *H04N 19/17* (2014.11); *H04N 19/179* (2014.11); *H04N 19/186* (2014.11); *H04N 19/33* (2014.11); *H04N 19/53* (2014.11)

(58) Field of Classification Search
USPC .................................................... 375/240.01
See application file for complete search history.

(56) References Cited

U.S. PATENT DOCUMENTS

| | | | | |
|---|---|---|---|---|
| 4,716,453 | A * | 12/1987 | Pawelski | H04N 11/046 375/240.01 |
| 7,174,049 | B2 | 2/2007 | Bhattacharjya | |
| 7,876,833 | B2 | 1/2011 | Segall | |
| 8,175,168 | B2 | 5/2012 | Sun | |
| 8,731,287 | B2 * | 5/2014 | Su | G06T 5/009 382/166 |
| 8,811,490 | B2 | 8/2014 | Su | |
| 9,066,070 | B2 * | 6/2015 | Su | H04N 19/136 |
| 2010/0046612 | A1 | 2/2010 | Sun | |
| 2012/0293620 | A1* | 11/2012 | Pahalawatta | H04N 19/597 348/43 |
| 2012/0314773 | A1* | 12/2012 | Gish | H04N 19/61 375/240.16 |
| 2013/0039430 | A1* | 2/2013 | Su | H04N 19/46 375/240.25 |
| 2013/0148029 | A1 | 6/2013 | Gish | |
| 2014/0105289 | A1 | 4/2014 | Su | |
| 2014/0369409 | A1* | 12/2014 | Su | H04N 19/119 375/240.12 |
| 2015/0063436 | A1* | 3/2015 | Lasserre | H04N 19/147 375/240.2 |
| 2015/0245041 | A1* | 8/2015 | Ichigaya | H04N 19/44 375/240.02 |
| 2015/0312571 | A1* | 10/2015 | Kim | H04N 19/159 375/240.03 |
| 2015/0341636 | A1* | 11/2015 | Tsai | H04N 19/597 375/240.02 |
| 2015/0350661 | A1* | 12/2015 | Yin | H04N 19/80 375/240.02 |

FOREIGN PATENT DOCUMENTS

| | | |
|---|---|---|
| JP | 2011-509536 | 3/2011 |
| WO | 2005/057933 | 6/2005 |
| WO | 2008/011502 | 1/2008 |
| WO | 2012/142471 | 10/2012 |
| WO | 2012/148883 | 11/2012 |

OTHER PUBLICATIONS

Kobayashi, T. "Interpolation of Ray-Space Data by Adaptive Filtering" SPIE Electronic Imaging, vol. 3958, 2000, pp. 252-259.

Tsai, An-Chao, et al "Classified Multifilter Up-Sampling Algorithm in Spatial Scalability for H.264/SVC Encoder" IEEE Transactions on Circuits and Systems for Video Technology, vol. 20, No. 6, Jun. 2010, pp. 861-869.

Wu, Yuwen et al "Bit Depth Scalable Coding" IEEE International Conference on Multimedia and Expo, Jul. 1, 2007, pp. 1139-1142.

Kumai, H. et al "Sharp's Proposals for HEVC Scalability Extension" MPEG Meeting, ISO/IEC JTC1/SC29/WG11, Apr. 27, 2012.

Wiegand, T. et al "High Efficiency Video Coding (HEVC) Text Specification Draft 8" ITU-T/ISO/IEC Joint Collaborative Team on Video Coding document JCTVC-J1003, Jul. 2012.

ITU-T and ISO/IEC JTC 1, "Advanced Video Coding for Generic Audiovisual Services" ITU-T Recommendation H.264 and ISO/IEC 14496-10, 2009.

\* cited by examiner

BACKWARD-COMPATIBLE CODING FOR ULTRA HIGH DEFINITION VIDEO SIGNALS WITH ENHANCED DYNAMIC RANGE

CROSS REFERENCE TO RELATED APPLICATIONS

This application claims priority to U.S. Provisional Application No. 61/748,411, filed on 2 Jan. 2013; U.S. Provisional Application No. 61/821,173, filed on 8 May 2013; and U.S. Provisional Patent Application No. 61/882,773 filed 26 Sep. 2013, all of which are incorporated herein by reference in their entirety.

TECHNOLOGY

The present invention relates generally to images. More particularly, an embodiment of the present invention relates to backward-compatible coding and decoding of high definition signals with enhanced dynamic range.

BACKGROUND

Audio and video compression is a key component in the development, storage, distribution, and consumption of multimedia content. The choice of a compression method involves tradeoffs among coding efficiency, coding complexity, and delay. As the ratio of processing power over computing cost increases, it allows for the development of more complex compression techniques that allow for more efficient compression. As an example, in video compression, the Motion Pictures Expert Group (MPEG) from the International Standards Organization (ISO) has continued improving upon the original MPEG-1 video standard by releasing the MPEG-2, MPEG-4 (part 2), and H.264/AVC (or MPEG-4, part 10) coding standards.

Despite the compression efficiency and success of H.264, a new generation of video compression technology, known as High Efficiency Video Coding (HEVC), in now under development. HEVC, for which a draft is available in "*High efficiency video coding (HEVC) text specification draft 8,*" ITU-T/ISO/IEC Joint Collaborative Team on Video Coding (JCT-VC) document JCTVC-J1003, July 2012, by B. Bross, W.-J. Han, G. J. Sullivan, J.-R. Ohm, and T. Wiegand, which is incorporated herein by reference in its entirety, is expected to provide improved compression capability over the existing H.264 (also known as AVC) standard, published as, "*Advanced Video Coding for generic audio-visual services,*" ITU T Rec. H.264 and ISO/IEC 14496-10, which is incorporated herein in its entirety.

Video signals may be characterized by multiple parameters, such as bit-depth, color space, color gamut, and resolution. Modern televisions and video playback devices (e.g., Blu-ray players) support a variety of resolutions, including standard-definition (e.g., 720×480i) and high-definition (HD) (e.g., 1920×1080p). Ultra high-definition (UHD) is a next generation resolution format with at least a 3,840×2,160 resolution (referred to as 4K UHD) and options to go as high as 7680×4320 (referred to as 8K UHD). Ultra high-definition may also be referred to as Ultra HD, UHDTV, or super high-vision. As used herein, UHD denotes any resolution higher than HD resolution.

Another aspect of a video signal's characteristic is it dynamic range. Dynamic range (DR) is a range of intensity (e.g., luminance, luma) in an image, e.g., from darkest darks to brightest brights. As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal (e.g., in one or more of a statistical, biometric or ophthalmological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms 'enhanced dynamic range' (EDR), 'visual dynamic range,' or 'variable dynamic range' (VDR) may individually or interchangeably relate to the DR that is simultaneously perceivable by a HVS. As used herein, EDR may relate to a DR that spans 5-6 orders of magnitude. Thus while perhaps somewhat narrower in relation to true scene referred HDR, EDR nonetheless represents a wide DR breadth. As used herein, the term 'simultaneous dynamic range' may relate to EDR.

To support backwards compatibility with legacy playback devices as well as new HDR or UHD display technologies, multiple layers may be used to deliver UHD and HDR (or EDR) video data from an upstream device to downstream devices. Given such a multi-layer stream, legacy decoders may use the base layer to reconstruct an HD SDR version of the content. Advanced decoders may use both the base layer and the enhancement layers to reconstruct an UHD EDR version of the content to render it on more capable displays. As appreciated by the inventors here, improved techniques for the coding of UHD EDR video are desirable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
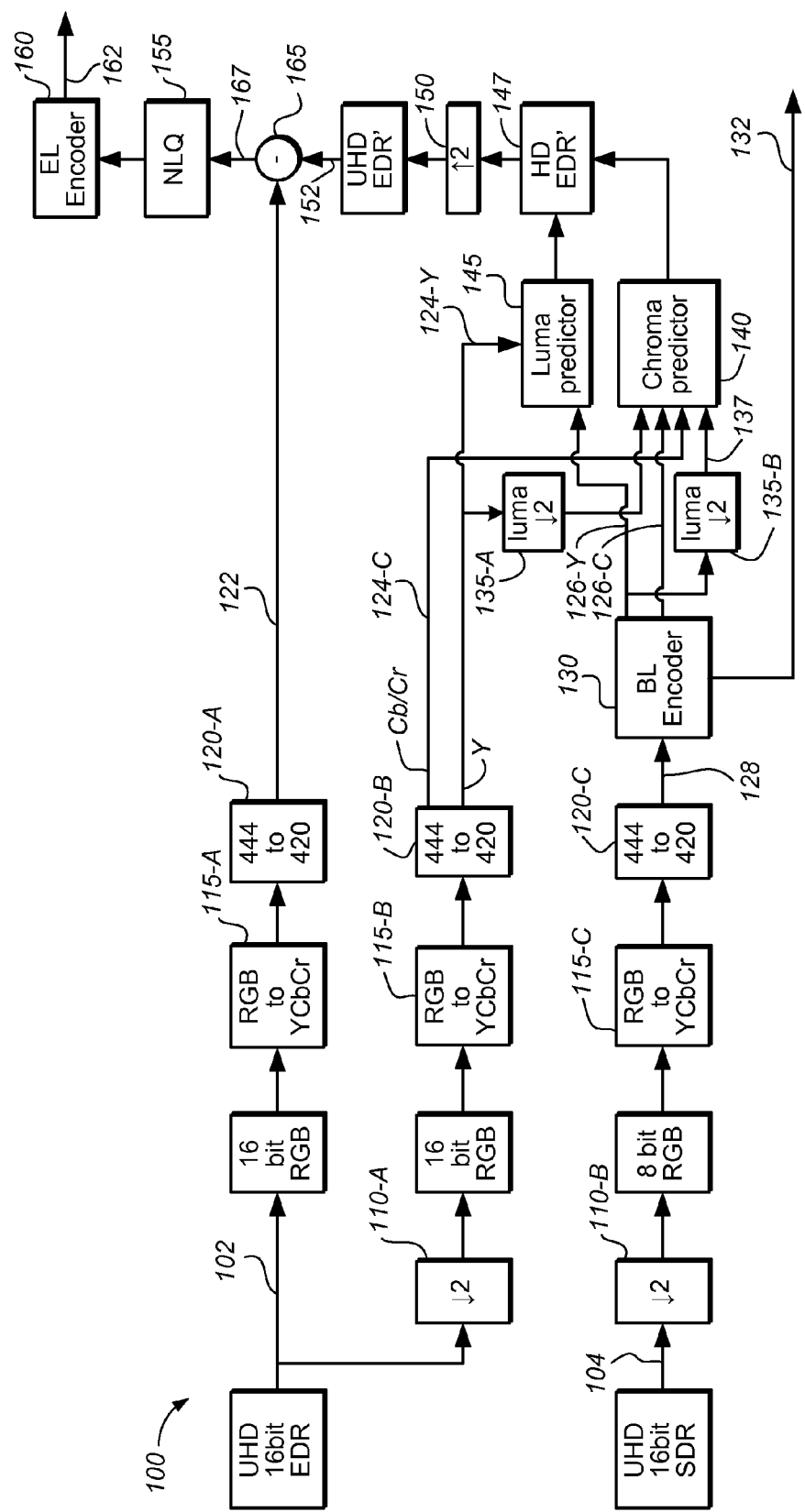
FIG. 1 depicts an example implementation of an UHD EDR coding system according to an embodiment of this invention.

Backward-compatible coding of ultra-high definition signals with enhanced dynamic range is described herein. Given an input video signal that may be represented by two signals: one signal with ultra-high definition (UHD) resolution and high or enhanced dynamic range (EDR), and the other signal with UHD (or lower) resolution and a standard dynamic range (SDR), the two signals are coded in a backward-compatible layered stream which allows legacy decoders to extract an HD standard dynamic range (SDR) signal and new decoders to extract the UHD EDR signal In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

Overview

Example embodiments described herein relate to backward-compatible coding and decoding of ultra-high definition signals with enhanced dynamic range. Given an input video signal represented by two signals: one signal with ultra-high definition (UHD) resolution and high or enhanced dynamic range (EDR), and the other signal at UHD (or lower) resolution and a standard dynamic range (SDR), the two signals are coded in a backward-compatible layered stream which allows legacy decoders to extract an HD standard dynamic range (SDR) signal and new decoders to extract the UHD EDR signal. In response to a base layer HD SDR signal, a predicted signal is generated using separate luma and chroma prediction models. In the luma predictor, luma pixel values of the predicted signal are computed based only on luma pixel values of the base layer, while in the chroma predictor, chroma pixel values of the predicted signal are computed based on both the luma and the chroma pixel values of the base layer. A residual signal is computed based on the input UHD EDR signal and the predicted signal. The base layer signal and the residual signal are coded separately to form a coded bitstream.

In another embodiment, a receiver demultiplexes a received layered bitstream to generate a coded base layer (BL) stream in HD resolution and standard dynamic range (SDR), and a coded enhancement layer stream in UHD resolution and enhanced dynamic range (EDR). The coded BL stream is decoded using a BL decoder to generate a decoded BL signal in HD resolution and standard dynamic range. In response to the decoded BL signal, a predicted EDR signal is generated, wherein pixel values of the luma component of the predicted signal are predicted based only on luma pixel values of the decoded BL signal, and pixel values of at least one chroma component of the predicted signal are predicted based on both the luma and chroma values of the decoded BL signal. The coded EL stream is decoded using an EL decoder to generate a decoded residual signal. In response to the decoded residual signal and the predicted signal an output UHD EDR signal may also be generated.

In another embodiment, residual signals in the enhancement layer are adaptively pre-processed before being quantized by a non-linear quantizer. In one embodiment, residual pixel values are pre-quantized to zero if a standard deviation of the pixels surrounding them is lower than a threshold.

In another embodiment, the input range of the non-linear quantizer is restricted according to a measure of the pixel connectivity of residual pixels with very large or very small pixel values;

In another embodiment, parameters of the non-linear quantizer are set based on the extreme values of the residual pixels across a continuous sequence of frames in a scene.

Encoder for Ultra-High Definition EDR Signals

Existing display and play-back devices, such as HDTVs, set-top boxes, or Blu-ray players, typically support signals of up to 1080p HD resolution (e.g., 1920×1080 at 60 frames per second). For consumer applications, such signals are now typically compressed using a bit-depth of 8 bits per pixel per color component in a luma-chroma color format where typically the chroma components have a lower resolution than then luma component (e.g., the YCbCr or YUV 4:2:0 color format). Because of the 8-bit depth and the corresponding low dynamic range, such signals are typically referred to as signals with standard dynamic range (SDR).

As new television standards are being developed, such as Ultra High Definition (UHD), it may be desirable to encode signals with enhanced resolution and/or enhanced dynamic range in a format that both legacy HDTV decoders and newer UHD decoders can process.

FIG. 1 depicts an embodiment of an example implementation of a system supporting backward-compatible coding of UHD signals with enhanced dynamic range (EDR). The encoder comprises a base layer (BL) Encoder (130) and an enhancement layer (EL) encoder (160). In an embodiment, BL Encoder 130 is a legacy encoder, such as an MPEG-2 or H.264 encoder, and EL Encoder 160 is a new standard encoder, such as an HEVC encoder. To support legacy BL decoders, BL encoder 130 is typically an 8-bit encoder; however, EL encoder 160 may support input streams with a higher bit depth, such as 10 bits, as specified by the H.264 and HEVC standards. However, this system is applicable to any combination of either known or future encoders, whether they are standard-based or proprietary.

As depicted in FIG. 1, an input signal, such as a movie or television broadcast, may be represented by two signals: an UHD EDR input (102) and an UHD SDR input (104). For example, the UHD EDR signal (102) may be a 4K (e.g., 3840×2160) resolution signal captured by an HDR camera and color-graded for an EDR display. The same signal may also be color-graded on a 4K SDR display to generate a corresponding 4K SDR signal 104. Alternatively, the SDR signal 104 may be generated by applying to the EDR signal any of known in the art tone-mapping or display management techniques. Without loss of generality, both of these input signals may be typically represented in the RGB color-space using 16-bit or equivalent (e.g., floating point) bit-depth representations. As used herein, the term N-bit signal denotes an image or video signal with one or more color components (e.g., RGB or YCbCr), wherein each pixel in any one of these color components (e.g., Y) is represented by an N-bit pixel value. Given an N-bit representation, each such pixel may take values between 0 and $2^N-1$. For example, in an 8-bit representation, for each color component, each pixel can take values between 0 and 255.

In an embodiment, UHD SDR signal 104 may be down-sampled into an HD SDR signal (e.g., 1080p), which is then color converted to a color format suitable for encoding using a legacy 8-bit encoder, e.g., in 8-bit YCbCr 4:2:0 color format. Such a conversion may comprise color transformations (such as RGB to YCbCr conversion 115-C) and chroma sub-sampling (e.g., 4:4:4 to 4:2:0 conversion 120-C). Thus, HD SDR signal 128 represents a backward-compatible signal representation of the original UHD EDR signal 102. Signal 128 may be encoded by BL encoder 130 to generate a backward-compatible coded bitstream 132. BL encoder 130 may compress or encode HD SDR signal 128 using any of the known or future video compression algorithms, such as MPEG-2, MPEG-4, part 2, H.264, HEVC, VP8, and the like.

Given UHD EDR signal 102, down-sampling (110-A) and color conversion processes (115-B and 120-B) may convert UHD EDR signal 102 into a reference prediction HD EDR signal 124. In a preferred embodiment, the down-sampling and color conversion processes (110-A, 115-B, and 120-B) (e.g., selected filters and color space) in this stage should be identical or as close as possible to the down-sampling and color conversion processes (110-B, 115-C, and 120-C) used to generate the HD SDR signal 128 in the base layer.

Following the UHD EDR to HD EDR transformation, the output of HD EDR signal 124 is separated into luma (Y 124-Y) and chroma (CbCr 124-C) components, which are applied to determine the prediction coefficients for luma predictor 145 and chroma predictor 140.

Given HD SDR signal 128, BL Encoder 130 generates not only coded BL bitstream 132 but also BL signal 126 which represents HD SDR signal 128 as it will be decoded by a corresponding BL Decoder. In some embodiments, signal 126 may be generated by a separate BL decoder (not shown) following BL encoder 130. In some other embodiments, signal 126 may be generated from the feedback loop used to perform motion compensation in BL encoder 130. As depicted in FIG. 1, the output of HD EDR signal 126 may also be separated into its luma (Y 126-Y) and chroma components (CbCr 126-C) which are applied to Luma predictor 145 and Chroma predictor 140 to predict HD EDR's signal 147.

In an embodiment, Luma predictor 145 may comprise a polynomial predictor to predict luma components of HD EDR' signal 147 based on the luma pixel values of base layer HD SDR signal 126-Y. In such a predictor, a luma pixel component may be predicted without taking into consideration any pixel values in any of the other color components of the signal. For example, let $g_i$ denote the luma pixel values of BL HD SDR signal (126-Y), then, without loss of generality, a third order polynomial predictor may be expressed as $$\hat{s}_i = \sum_{k=0}^{3} a_k g_{i-k} + \sum_{k=0}^{3} b_k g_{i-k}^2 + \sum_{k=0}^{3} c_k g_{i-k}^3,$$

where $a_k$, $b_k$, and $c_k$ are the predictor coefficients. In an embodiment, the predictor coefficients may be determined by any known in the art minimization-error techniques, such as minimizing the mean-square-error (e.g., $\|s_i - \hat{s}_i\|^2$) between the predicted value ($\hat{s}_i$) and the luma pixel values in the reference HD EDR signal (124-Y) ($s_i$).

In an embodiment, chroma predictor 140 may also be a polynomial predictor, similar to the one described earlier; however, in a preferred embodiment, chroma predictor 140 comprises a multi-color channel, multiple regression (MMR), predictor, as the ones described by G-M Su et al., in PCT application Ser. No. PCT/US2012/033605 (published as WO2012/142471), "Multiple color channel multiple regression predictor," filed on Apr. 13, 2012, which is incorporated herein by reference in its entirety. An MMR predictor predicts the chroma components of the HD EDR's signal using information from both the luma and the chroma pixel values in the HD EDR reference signal 124 and the base layer HD SDR signal 126. The prediction coefficients in the MMR model may also be determined using mean-square-error minimization techniques by minimizing the MSE between the predicted chroma values and luma and chroma pixel values of the reference HD EDR signal 124.

Because both HD SDR signal 126 and reference HD HDR signal 124 are in a YCbCr 4:2:0 format, where the spatial resolution of the luma component is double the spatial resolution of each of the chroma components, the luma components of both of these signals are down-sampled (135-A and 135-B) before being applied to the chroma predictor 140. In a preferred embodiment, the filters used in luma down-sampling 135-A and 135-B are the same as the chroma down-sampling filters used in the 4:4:4 to 4:2:0 processing (120). Luma and Chroma prediction coefficients may be updated at a variety of time intervals of interest, such as per scene, per group of pictures, or per frame. Prediction filter coefficients may be communicated to a decoder by a variety of methods, such as embedding their values in the bitstream as auxiliary data or metadata.

Given predicted HD EDR' signal 147, up-sampler 150 generates an UHD EDR' signal 152, which is used to generate the residual signal 167. Because UHD EDR's signal is in the preferred coding format (e.g., YCbCr 4:2:0), additional color transformation (115-A) and chroma down-sampling (120-A) steps may be needed to convert the original UHD EDR signal 102 from the original format (e.g., RGB) to UHD EDR signal 122 in the preferred coding format. Signals 122 and 152 are subtracted to create the EL residual signal 167.

In an embodiment color transformation (115-A) and chroma sub-sampling processes (120-A) are identical or as close as possible to the color transformation (115-B and 115-C) and chroma sub-sampling processes (120-B and 120-C) being used to generate the BL-coded signal 128 and the prediction signal 124.

In an embodiment, before coding EL signal 167 by EL encoder 160, the signal may be processed by a non-linear quantizer (NLQ) 155. Examples of suitable non-linear quantizers may be found in PCT patent Application Ser. No. PCT/US2012/034747 (published as WO2012/148883), "Non-Linear VDR Residual Quantizer," filed on Apr. 24, 2012, which is incorporated herein by reference in its entirety. The output of the NLQ 155 may be compressed using an EL encoder 160 to generate a coded EL bitstream 162 which may be transmitted to suitable decoders. Furthermore, in some embodiments, residual (167) may also be spatially down-sampled by a down-sampling module (not shown). Such down-sampling (e.g., by a factor of 2 or 4 in both dimensions) improves coding efficiency, especially at very low bit rates. Down-sampling may be performed either before or after the non-linear quantizer (155).

EL encoder 160 may be any suitable encoder, such as those described by the MPEG-2, MPEG-4, H.264, HEVC specifications and the like. In an embodiment, BL coded bitstream 132, EL coded bitstream 162, and metadata related to the coding process (e.g., the predictor parameters or look-up tables) may be multiplexed into a single bit stream (not shown).

As depicted in FIG. 1, in a preferred embodiment, down-sampling (110-A or 110-B) is preferably applied before color format transformations (115-B and 120-B or 115-C and 120-C); however, in some embodiments, the down-sampling may be performed after the color transformations. For example, in one embodiment, input to 110-A may be received directly from the UHD EDR YCbCr signal 122, hence eliminating the need to do color transform processing 115-B and 120-B to generate HD EDR reference signal 124. Similarly, down-sampling 110-B could be performed after the color conversion step 120-C.

In some embodiments, the base line HD SDR signal 128 may already be available to encoder 100 in the correct resolution and color format. In such a case, the down-sampling (110-B) and color transformations steps (115-C and 120-C) may be bypassed.

In some embodiments, the UHD EDR signal 102 may be available in lower or higher precision than 16-bit; however, its precision is expected to be higher than 8 bits (e.g., 10 bits or 12 bits). Similarly, UHD SDR signal 104 may already be available in a precision lower than 16 bits (e.g., 8 bits or 10 bits).

Decoder for Ultra-High Definition EDR Signals

Figure 2:
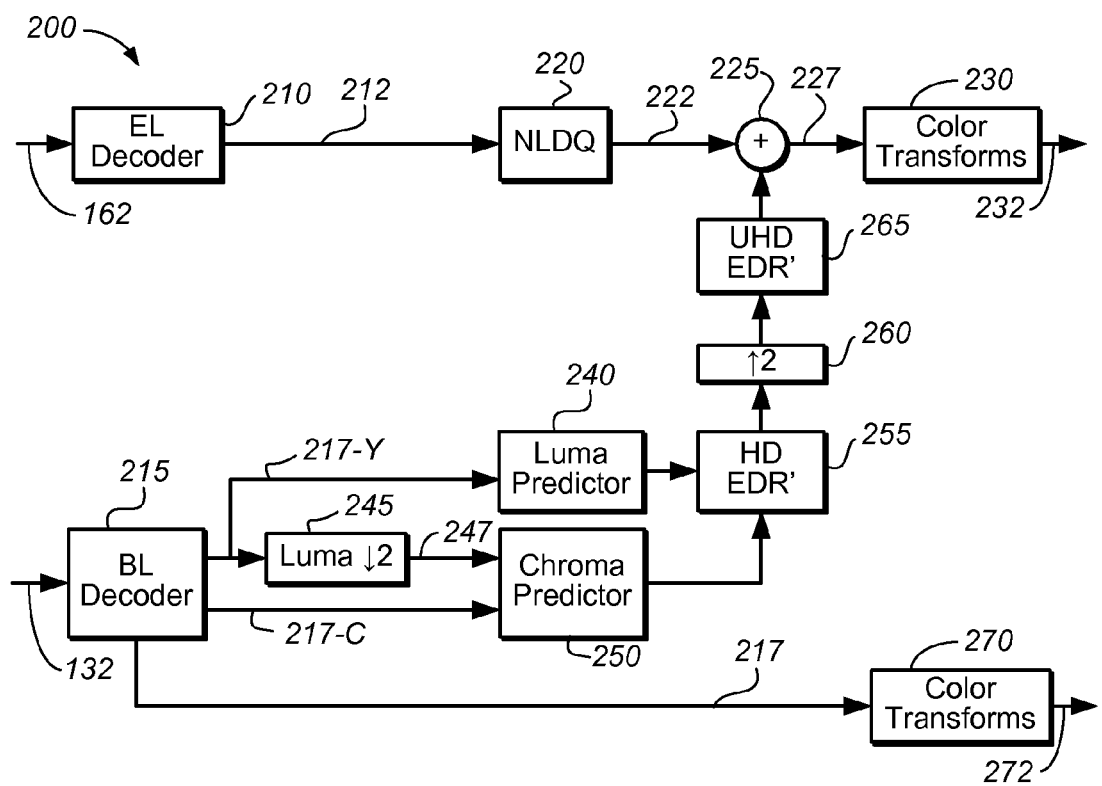
FIG. 2 depicts an example implementation of an UHD EDR decoding system according to an embodiment of this invention.

FIG. 2 depicts an embodiment of an example implementation of a system supporting backward-compatible decoding of UHD signals with enhanced dynamic range (EDR). In response to a coded signal transmitted by an encoder (e.g., 100), decoder 200 receives and demultiplexes a coded bitstream that comprises at least two coded sub-streams: a coded BL stream 132 and a coded EL stream 162.

Coded BL stream 132 comprises an HD SDR signal (217) which can be decoded using BL decoder 215. In an embodiment, BL Decoder 215 matches BL Encoder 130. For example, for backward compatibility with existing broadcast and Blu-ray standards, BL decoder 215 may comply with one or more of the MPEG-2 or H.264 coding specifications. Following BL decoding 215, an HD SDR decoder may apply to decoded HD SDR signal 217 additional color transforms (270) to translate the incoming signal from a color format suitable for compression (e.g., YCbCr 4:2:0) to a color format suitable for display (e.g., RGB 4:4:4). Receivers with enhanced resolution and/or EDR display capabilities may combine information from both the BL and EL bitstreams (132 and 162) to generate an UHD signal with enhanced dynamic range (e.g., 232) as depicted in FIG. 2.

Following BL decoding 215, the decoded signal 217 is divided into its luma (217-Y) and chroma (217-C) components. The luma component (217-Y) is processed by a luma predictor 240 to generate luma estimate values for HD EDR' signal 255. The luma and chroma components are also processed by chroma predictor 250 to generate chroma estimate values for HD EDR' signal 255. In an embodiment, before processing the luma signal 217-Y by the chroma predictor, it is sub-sampled by down-sampler 245 so it matches the resolution of the chroma components. Luma and chroma predictors (240 and 250) match the luma and chroma predictors (145 and 140) in encoder 100. Thus, luma predictor 240 may be a polynomial predictor while chroma predictor may be an MMR predictor. In an embodiment, the characteristics and filter parameters of these predictors may be determined using metadata embedded in the received coded bitstream. Following the luma and chroma prediction steps (240 and 250), predicted HD EDR' signal 255 is up-sampled (260) to generate UHD EDR' signal 265.

Given coded bitstream 162, EL decoder 210 decodes it to generate UHD EDR residual signal 212. EL decoder 210 matches EL encoder 160. If the encoder 100 applied a non-linear quantizer 155 to residual 167, then the non-linear quantization process is reversed by applying a non-linear de-quantizer (NLDQ) 220 to generate de-quantized residual 222. If the encoder (100) applied spatial down-sampling to the residual (167), then, a spatial up-sampler (not shown) before or after NLDQ (220) may up-sample the decoded residual (e.g., 212 or 222) to its proper spatial resolution. By adding (225) residual 222 to UHD EDR' estimate 265, decoder 200 may generate an UHD EDR signal 227 matching the resolution and color format (e.g. 4:2:0 YCbCr) of UHD EDR signal 122 transmitted by the encoder. Depending on the target application, a set of color transforms (230) may transform UHD EDR signal 232 into a format suitable for display or other processing. In an embodiment, given a YCbCr 4:2:0 signal 227, color transforms 230 may comprise a 4:2:0 to 4:4:4 chroma up-sampling step, followed by a YCbCr to RGB color transformation step.

Encoding and Decoding of Mixed Progressive and Interlaced Formats

Figure 3:
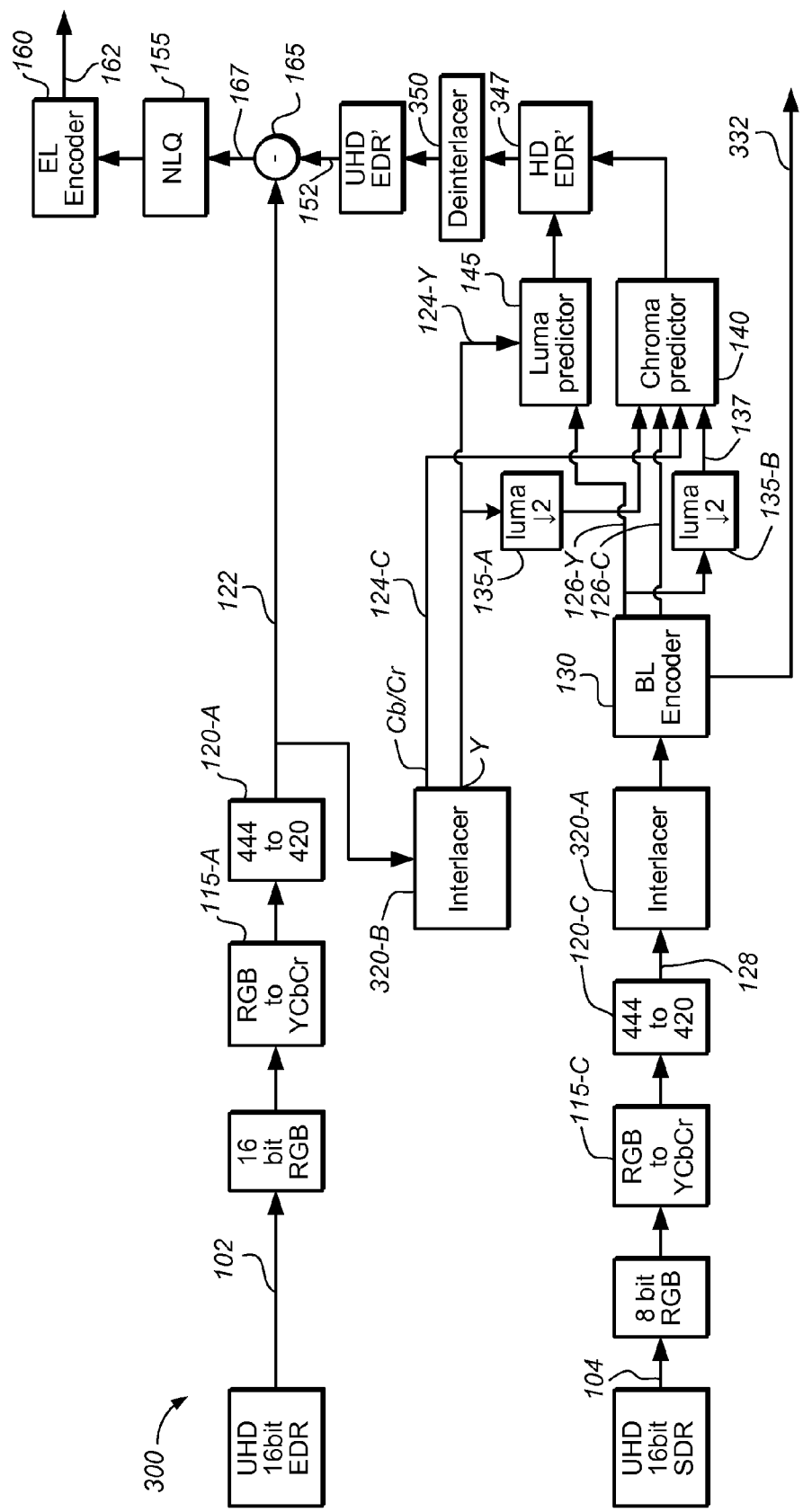
FIG. 3 depicts a variation of the system depicted in FIG. 1 according to an embodiment of this invention, where the base layer comprises an interlaced signal.

Despite the increased adoption of progressive video signals (e.g., 720p or 1080p), broadcasting of interlaced video signals (e.g., 1080i) is still quite common in video broadcasting. In another embodiment, FIG. 3 depicts another example of an UHD EDR encoding system (300) which supports layer encoding using a mix of progressive and interlaced formats. In an example, BL signal (332) is coded in an interlaced format (e.g., 1080i or 2160i) while EL signal (162) is coded in a progressive format (e.g., 2160p).

Encoding system (300) shares most of the functionality of encoding system (100), hence in this section only the key differences between the two systems will be discussed. As depicted in FIG. 3, in the base layer processing, SDR signal (104) is color converted to a color format suitable for encoding (e.g., 4:2:0 YCbCr) using BL encoder (130). In an example embodiment, the output (332) of BL Encoder (130) may comprise an interlaced SDR signal. Interlacer (320-A) may apply any interlacing and down-sampling techniques known in the art to convert progressive input (128) into an interlaced signal of the desired coding resolution of the base layer signal (332) (e.g., 1080i).

Compared to system (100), in the enhancement layer, processing components (110-A), (115-B), and (120-B) of system (100), may all be replaced by interlacer (320-B). Interlacer (320-B) may apply any interlacing and down-sampling techniques known in the art to convert progressive input (122) into an interlaced signal (124) matching the resolution of interlaced signal (126). In a preferred embodiment, the down-sampling and interlacing functions of (320-A) and (320-B) should be identical or as close as possible to each other to reduce color artifacts and improve overall image coding quality.

Luma and chroma predictors (145 and 140) in system (300) remain the same as those in system (100); however, they now operate on the separate fields of their inputs, since signals (124) and (126) are now interlaced signals.

Deinterlacer (350) has dual functionality as well: it deinterlaces predicted HD EDR's signal (347), and up-samples it to match the resolution of UHD EDR signal (122), thus generating predicted UHD EDR's signal (152) with the same resolution and format as signal (122). The processing of the residual (167) in system (300) remains the same as the one described for system (100).

In some embodiments, SDR signal (104) may be already in interlaced format, then interlacer (320-A) may be replaced by a down-sampler. Interlacer (320-A) may be eliminated if input signal (104) is already interlaced and at the proper resolution.

In an embodiment, input signals (102) and (104) may be both HD resolution signals (e.g., 1080p). Then the output of system (300) may comprise a coded interlaced HD (e.g., 1080i) base layer signal (332) and a coded progressive HD (e.g., 1080p) residual (162).

In an embodiment, both the BL signal (332) and the residual (162) may be at the same resolution but at mixed format. For example, BL signal (332) may be coded at 2160i while EL signal (162) may be coded at 2160p.

Figure 4:
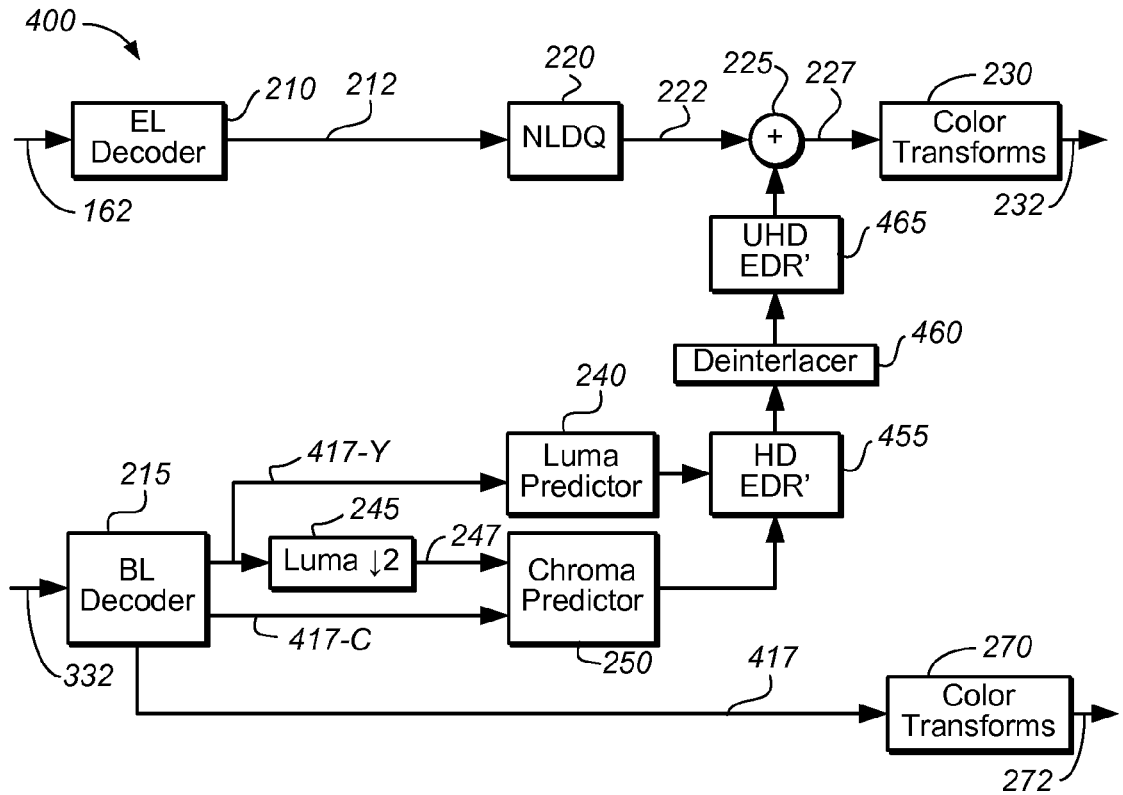
FIG. 4 depicts a variation of the decoding system of FIG. 2 according to an embodiment of this invention, where the base layer comprises an interlaced video signal.

FIG. 4 depicts an embodiment of an example implementation of a decoder system (400) for decoding signals generated by mix-format encoder (300). System (400) is almost identical to decoder system (200), except for the following differences: a) decoded BL signal (417) is now an interlaced video signal, (b) luma and chroma predictors (240 and 250) operate on the fields of interlaced signals (417) and (247), and c) predicted HD EDR's signal (455) is an interlaced signal.

Deinterlacer (460) matches in functionality the deinterlacer (350) in system (300); hence it deinterlaces and up-samples interlaced HD EDR's signal (455) so that its output, UHD EDR' signal (465), has the same resolution and format as decoded error residual signal (222).

As noted earlier, system (300) may also include a spatial down-sampling module (not shown) in the EL path, either before or after the non-linear quantizer (155). In such a case, in decoder (400), a spatial up-sampler before or after NLDQ (220) may be used to restore the decoded residual (212) to its proper spatial resolution.

Luma-Range-Driven Adaptive Up-Sampling

As depicted in FIG. 1, following the luma and chroma prediction steps (140, 145), predicted HD EDR' signal (147) is up-sampled by a factor of two (150) to generate predicted UHD EDR' signal 152. A similar process is being performed also in decoder (200), where following the luma and chroma prediction steps (240, 250), predicted HD EDR' signal (255) is up-sampled by a factor of two (260) to generate predicted UHD EDR' signal (265). Up-samplers (150) and (260) may comprise any up-sampling techniques known in the art; however, improved image quality may be achieved by employing luma-range driven adaptive up-sampling techniques as described in this section.

It has been observed that the prediction error (167) between the original EDR signal (122) and its predicted value (152) may vary depending on the luminance values in the corresponding SDR signal (104). That is, residuals (167) in bright or highlight areas in the image exhibit different types of characteristics than residual in the dark tones or the mid-tone areas. In an embodiment, the luminance range of the SDR input may be divided into two or more luma sub-ranges. An adaptive up-sampling filtering method may apply different up-sampling filters to different pixels of the EDR predicted image, where each filter is selected according to the luma sub-range of the corresponding pixels in the SDR image. The thresholds that identify each of these luma sub-ranges and the identification of the filters being used, and/or the filter coefficients themselves may be communicated from the encoder (100) to the decoder (200) via metadata or other ancillary data, so that both the encoder and the decoder may apply the same up-sampling filters for improved image quality.

Let $\hat{s}_{ij}$ denote the luminance pixel values of HD EDR' signal (147), which is predicted based on the luminance values of the output of the BL-Encoder (130), that is, SDR signal $s_{ij}$ (126-Y). Let th(i) (i=0, N) denote a set of thresholds dividing the luminance range of pixels $s_{ij}$ ($0 \le s_{ij} \le 1$) into N luma ranges (N≥1) of interest (e.g., for N=3, into blacks, mid-tones, and high-lights). Let $H_i$ denote a set of filter coefficients for the i-th (i=1, N) up-sampling filter being used in step (150) or (260) for the i-th luma range of interest, and let $f(\bar{s}_{ij})$ denote a function of $s_{ij}$ or its local neighbors, then in an embodiment, up-sampling filtering (e.g., 150 or 260) may be performed according to the following Algorithm 1 expressed in pseudo code:

Algorithm 1—Luma-Range-Driven Up-Sampling Process

```
// up-sampling process for N luma ranges
    if ((f(s̄_ij)>=th(0)) && (f(s̄_ij) <th(1)))
        use filter H_1;
    elseif
    ((f(s̄_ij) >=th(1)) && (f(s̄_ij) <th(2)))
        use filter H_2;
    ...
    elseif
    ((f(s̄_ij) >=th(N-1))&& (f(s̄_ij) <th(N)))
        use filter H_N;
```

In some embodiments, $H_i$ may represent the filter coefficients of a 2-D non-separable filter. In some other embodiments, $H_i$ may represent the coefficients of a 2-D separable up-sampling filter, comprising, without limitation, coefficients for a horizontal and a vertical up-sampling filter. Filter coefficients $H_i$ may be pre-computed and stored in memory or they may be computed adaptively according to some image quality criterion. For example, in an embodiment, filter coefficients $H_i$ may be computed so that the mean-square error between the output of the up-scaling filter, predicted UHD EDR' signal (152), and the input UHD EDR signal (122) is minimized.

In some embodiments, $f(\bar{s}_{ij})$ may represent a single pixel value of interest (e.g., $s_{ij}$ or $s_{ij-1}$), while in some other embodiments $f(\bar{s}_{ij})$ may represent a local average or some other function of one or more pixels surrounding $s_{ij}$ (e.g., a median, a minimum, or a maximum).

In an embodiment, thresholds th(i) maybe determined based on the image statistics of the input signal (e.g., the average value of blacks, mid-tones, or highlights). These statistics may be computed on a per pixel region basis, a frame basis or on a per scene basis (e.g., a group of sequential pictures with similar luminance characteristics). In some embodiments, th(i) may be determined iteratively as part of the filtering design process. For example, consider the case where filter coefficients $H_i$ are computed based on some optimization criterion, e.g., minimizing the mean square error (MSE) of signal (167), then, in an embodiment, Algorithm 2 describes in pseudo-code an example method to determine a new threshold (th*) given two bounding thresholds (t_low and t_high), and a threshold search step (step):

Algorithm 2—Threshold Determination for Two Luma Sub-Ranges (N=2)

```
Partition_Function(t_low, t_high, step)
{
  j=0;
  Pth[100]; //array of possible thresholds
  D[100]; //array of distortion values
  for(th = t_low, th <= t_high, th = th+step)
  {
    Pth(j) = th;
    Divide input s_ij pixels into the two luma ranges A1 and A2,
    where for A1 (f(s̄_ij) >= t_low ) && (f(s̄_ij) < th )
    and for A2 (f(s̄_ij) >= th) && (f(s̄_ij) < t_high)
    Derive filter H_1 considering only the pixels within A1
    Derive filter H_2 considering only the pixels within A2
    Perform up-scaling using the two filters H_1 and H_2 to
    determine up-scaled predicted signals v̂_ij (152)
    Compute D(j), the MSE of error residual signal (167)
```

$$D(j) = \sum_j |v_{ij} - \hat{v}_{ij}|^2$$

```
    j++;
  }
  Define as the optimum threshold th*, the value of Pth(j) for which
  D(j) is minimum:
```

$$th^* = \min_{\{Pth(j)\}} D(j)$$

```
  Compute filter coefficients H_1 and H_2 for the computed th*
  return(th*);
}
```

In the above description, t_low and t_high denote boundary values of interest one might search for a threshold. For example, in an embodiment, t_low=min($s_{ij}$)=0 and t_high=max($s_{ij}$)=1 (where 1 denotes the normalized maximum possible value), cover the full range of possible luminance values; however, in other embodiments, the range of boundary values may be much smaller. For example, computing thresholds for an input frame at time t may take into consideration the threshold values computed earlier, say at time t−1, thus searching only within a smaller range centered around the previous threshold (e.g., (th(i)−C, th(i)+C), where C is a constant).

Given Algorithm 2, in some embodiments, a similar approach may be used to sub-divide the luma range of a picture frame into additional partitions of luminance range using additional thresholds. In an example embodiment, the following algorithm (Algorithm 3) may be used to sub-divide a given luminance range (A, B) into two or three luminance sub-ranges.

Algorithm 3—Threshold Determination for Three Luma Sub-Ranges (N=3)

```
// Determine threshold for N=2
TH* = Partition_Function( A, B, step)
D = D(TH*) // Calculate overall distortion using two partitions
// Try further partition in low band
TH_L* = Partition_Function(A, TH*, step)
DL = D(TH_L*) // Calculate overall distortion using three partitions
// Try further partition in high band
TH_H* = Partition_Function( TH*, B, step)
DH = D(TH_H*) // Calculate overall distortion using three
partitions.
If( (DL < DH )&&( DL < D ))
  Select partition in low band
    th[ ] = { A, TH_L*, TH*, B }
elseif( (DH < DL )&&( DH < D ) )
  Select partition in high band
    th[ ] = { A, TH*, TH_H*, B }
```

```
else
  Stay with two partitions
    th[ ] = { A, TH*,B }
end
```

Thresholds computed by Algorithms 2 and 3 may be applied to Algorithm 1 in both the encoder (100) and the decoder (200). In an embodiment, the computed thresholds may be transmitted from the encoder (100) to the decoder (200) using metadata.

As described earlier, de-interlacers (350) and (460) may combine both de-interlacing and up-sampling functionality. Artisans in the field of image processing will appreciate that luma-range-driven methods discussed herein for the improved design of up-samplers (150) and (126) may also be applied in the design of the up-samplers in de-interlacers (350) and (460).

Adaptive Residual Processing

As depicted in FIG. 1 and FIG. 3, in the enhancement layer (EL), residual signal (167) may be processed by non-linear quantizer (NLQ) (155) before being compressed by EL Encoder (160) to generate EL stream (162). Without loss of generality, FIG. 5 depicts an example input-output relationship for NLQ (155) according to an embodiment of this invention.

Figure 5:
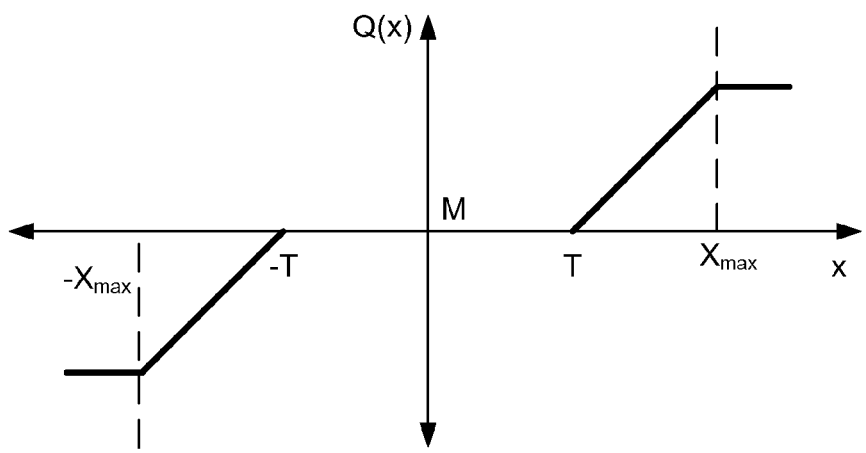
FIG. 5 depicts an example implementation of a non-linear quantizer for a residual signal in an enhancement layer according to an embodiment of this invention.

As depicted in FIG. 5, let (−$X_{max}$, $X_{max}$) denote the range of pixel values of the residual pixels x (167) to be coded in a frame or frame region of interest. Let Level denote the number of available codewords in each side of the quantizer (e.g., Level=128 for x≥0), then, given a positive threshold T, let $$SL = \frac{Level}{X_{max} - T}.$$

Then, given input residuals x, after clipping x within the range (−$X_{max}$, $X_{max}$), the quantization operations of FIG. 5 may be expressed as $$Q(x) = \begin{cases} \text{floor}(M + (SL*(x-T)) + 0.5) & \text{if } x > T \\ M & \text{if } |x| \le T \\ \text{floor}(M + (SL*(x+T)) - 0.5) & \text{if } x < -T \end{cases}$$

where Q(x) denotes the quantized output, SL denotes the slope of Q(x) within (T, $X_{max}$), and M denotes an offset value representing the output codeword when the residual x=0. Threshold T is a relatively small number and in some embodiments T=0.

Parameters T, M, $X_{max}$, and SL may be defined separately for each color component of residual signal x and may be communicated to a receiver using metadata. In some embodiments, one or more of the NLQ quantization parameters may also be defined for a whole frame, one or more partitions or sub-regions of a frame, or for a group of frames (e.g., a scene).

Given such a quantizer, on a receiver (e.g., (200)), the de-quantization process (e.g., NLDQ (220)), may be expressed as $$\hat{R}_{cmp} = \begin{cases} 0, & R_{cmp} = M \\ SL*((R_{cmp} - M) - 0.5*\text{sign}(R_{cmp} - M)) + \\ \quad T*\text{sign}(R_{cmp} - M) & R_{cmp} \neq M \end{cases}$$

where $$\text{sign}(x) = \begin{cases} -1 & x < 0 \\ 1 & x \geq 0, \end{cases}$$

$R_{cmp}$ denotes the received (decoded) residual (or EL signal (212)), and $\hat{R}_{cmp}$ denotes the de-quantized output (222), which also may be bounded, e.g., in a range $(-\hat{R}_{max}, \hat{R}_{max})$.

Experimental results have indicated that a proper pre-processing of the residual data (167) combined with an adaptive setting of the parameters of NLQ (155) may yield more efficient coding of the EL stream, thus resulting in reduced coding artifacts and better overall image quality. In this section, three residual pre-processing algorithms are described next.

Residual Pre-Quantization Using a Standard Deviation Metric

Figure 6A:
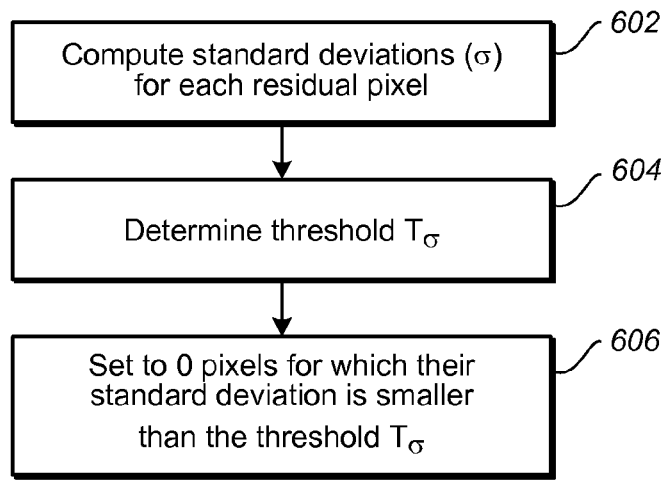
FIG. 6A depicts an adaptive pre-quantization process of residual pixels according to an embodiment of this invention.

Improper quantization and coding of the residual signal (167), especially when coding the EL stream at a relatively low bit rate (e.g., 0.5 Mbits/s) may result in blocky artifacts in the decoded signal (232). In an embodiment, those artifacts may be reduced by adaptively pre-quantizing certain residual values that are perceived to be located in relatively "smooth" areas. An example of such a process according to an embodiment of this invention is depicted in FIG. 6A, where, without limitation, measuring the smoothness of a rectangular pixel region surrounding each residual pixel is based on computing the standard deviation of the pixels in that region.

Let $r_{fi}$ denote the i-th residual pixel of the f-th frame. Let this pixel be at the center of a $W_\sigma \times W_\sigma$ pixel area (e.g., $W_\sigma=15$), denoted as $n_{fi}$. Then, in step (602), the standard deviation $\sigma_{fi}$ for this pixel may be determined as $$\sigma_{fi} = \sqrt{\frac{1}{W_\sigma^2} \sum_{j \in n_{fi}} (r_{fi} - \mu_{fi})^2},$$

where $$\mu_{fi} = \frac{1}{W_\sigma^2} \sum_{j \in n_{fi}} r_{fj}.$$

Given a threshold $T_\sigma$, in step (606), residual pixels $r_{fi}$ may be set to a predetermined value (e.g., zero) if $\sigma_{fi} < T_\sigma$. Threshold $T_\sigma$ may be fixed, or in a preferred embodiment, may be determined adaptively depending on the residual frame characteristics and the overall bit rate requirements. For example, let $P_f$ denote the total number of pixels in the f-th frame. Let $\sigma_{fi}$ denote the computed standard deviation values in step (602). In step (604), $T_\sigma$ may be determined as follows:

(a) Sort $\sigma_{fi}$ in descending order to generate a sorted $\tilde{\sigma}_{fi}$ list
(b) Then $T_\sigma$ is the $k*P_f$ value in the $\tilde{\sigma}_{fi}$ sorted list, where k is defined in the range (0.0 to 1.0). For example, for k=0.25, given a 1920×1080 frame, $T_\sigma$ corresponds to the value of the 518,400-th standard deviation value in the sorted list.

Alternative methods to compute smoothness may also include computing the mean or variance of the $W_\sigma \times W_\sigma$ pixels, or computing a metric based on an edge map of the area surrounding each pixel, or using any other smoothness detection and determination algorithm known in the art.

Residual Tail-End Boundaries Adjustment

Let $X_f^+$ denote the maximal positive residual value in frame f and let $X_f^-$ denote the absolute value of the minimal negative residual value in frame f. Then $$X_f^+ = \max\{r_{fi} | i=0, \ldots, P_f-1\},$$

and $$X_f^- = |\min\{r_{fi} | i=0, \ldots, P_f-1\}|,$$

As depicted in FIG. 5, the input boundaries of the quantizer could be determined in terms of $X_f^+$ and $X_f^-$ (e.g., $X_{max} = X_f^+$); however, experimental results have shown that residual values have a bell-like distribution and there are typically very few pixels in each frame that are close to either $X_f^+$ or $X_f^-$. As noted earlier, for the quantizer depicted in FIG. 5, the quantization step is proportional to $$\frac{X_{max}}{\text{Level}}.$$

For a fixed number of codewords (e.g., the value of Level), the distortion due to quantization is directly proportional to the value of $X_{max}$; hence smaller $X_{max}$ values are preferred. In an embodiment, instead of determining $X_{max}$ according to $X_f^+$ or $X_f^-$, a new, smaller range $[Th_f-, Th_f+]$ is determined. Before applying NLQ (155), residual pixel values are restricted (or clipped) to fit within the new range $[Th_f-, Th_f+]$; where for frame f, $Th_f+$ denotes a boundary for positive residuals and $Th_f-$ denotes a boundary for negative residuals. That is, $$r_{fi} = \text{clip3}(r_{fi}, Th_f-, Th_f+),$$

where the clip3( ) function denotes that residual pixel values larger that $Th_f+$ are clipped to $Th_f+$, and residual pixel values smaller than $Th_f-$ are clipped to $Th_f-$.

Figure 6B:
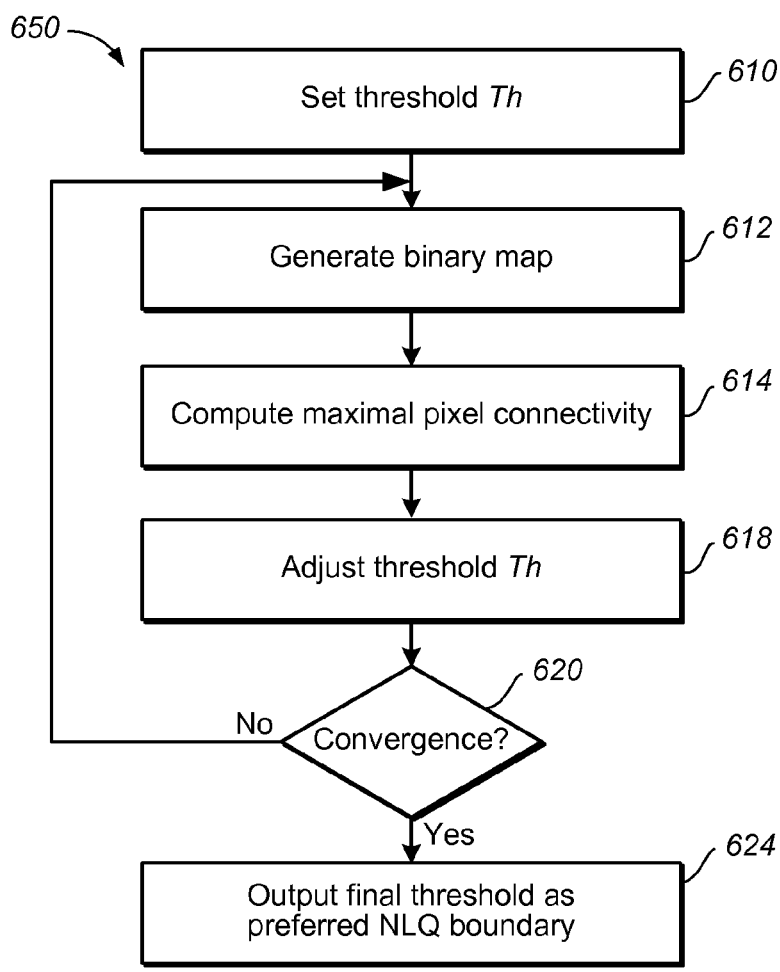
FIG. 6B depicts and adaptive process to set the lower or upper input boundaries of a non-linear quantizer for residual signals according to an embodiment of this invention.

While a smaller input range for the NLQ process yields smaller errors due to quantization, unrestricted clipping of the residual signal may yield noticeable artifacts, hence there is a need to adapt the selection of the new range according to the characteristics of the residual signal. In an embodiment, these two thresholds are adaptively determined based on the observed connectivity (or sparseness) of the residual pixel values. That is, isolated residual pixels with very large values may be clipped with minimum effect on overall quality; however, pixel values of connected residual pixels should be properly coded. An example implementation of such a boundary determination process according to an embodiment of this invention is depicted in FIG. 6B by process (650).

Process (650) computes a threshold Th which satisfies the condition that residual pixel values equal or larger than Th are considered sparsely connected, hence they can be clipped. Process (650) may be used to compute either of the $Th_f-$ or $Th_f+$ boundaries, depending on the input residual values. For example, to determine $Th_f+=Th$, the process considers only positive residual pixel values, e.g., in the range $(0, X_f^+)$, $$R_{fi} = \begin{cases} r_{fi} & \text{if } r_{fi} > 0 \\ 0 & \text{otherwise}. \end{cases}$$

To determine $Th_f^-=Th$, the process considers only the absolute values of negative residual pixel values, e.g., in the range $(0, X_f^-)$, $$R_{fi} = \begin{cases} |r_{fi}| & \text{if } r_{fi} < 0 \\ 0 & \text{otherwise.} \end{cases}$$

In step (610), the process begins by setting an initial value to threshold Th. So, given the original boundaries of $r_{fi}$ (e.g., Th_L=0 and Th_H=$X_f^+$ or Th_H=$X_f^-$), in an example embodiment, an initial threshold may be set to the middle value of the known range, e.g., $$Th=(Th\_H+Th\_L)/2.$$

Given threshold Th, in step (612), a binary map $M_f$ is generated, wherein, the elements of the binary map are computed as $$m_{fi}=(R_{fi} \geq Th)$$

$$M_f(i)=m_{fi}.$$

Given $M_f$, in step (614), one can determine the connectivity of each binary pixel. For example, in MATLAB, neighbor connectivity (e.g., 4-pixel or 8-pixel connected neighborhood) can be computed using the function bwconncomp. Let $NC_f(i)$ denote the number of neighbors of each pixel in the binary image $M_f$. In step (618), threshold Th may be adjusted so that no pixels are clipped if their connectivity exceeds a predetermined connectivity threshold $T_{cc}$ (e.g., $T_{cc}$=5 pixels). For example, if the maximal pixel connectivity across all pixels exceeds a predetermined connectivity threshold $T_{cc}$, then, the threshold Th may be increased, otherwise, it may be decreased. For example, using a binary search, if(max{$NC_f(i)$}≥$T_{cc}$)//the maximal connectivity for each pixel exceeds Tcc $Th\_L=Th;$ else $Th\_H=Th;$ $Th\_old=Th;$ $Th=(Th\_H+Th\_L)/2;$ In order to reduce the computational complexity, in an embodiment, the process may include a convergence test step (620). For example, convergence step (620) may compute the difference between the previous (or old) and new thresholds. If their difference is larger than a predetermined convergence threshold, then the process continues again from step (612) with the new threshold. Otherwise it terminates and outputs the final boundary to be used (e.g., $Th_f+=Th$)

Scene-Based Non-Linear Quantization

As discussed earlier, in some embodiments, non-linear quantizer (155) may be expressed in terms of the following parameters: $X_{max}$, offset (e.g., M), and Level (see also discussion related to FIG. 5). In some embodiments, it may be beneficial to determine these parameters in terms of the residual pixel characteristics in a sequence of frames, e.g., a scene.

Given $X_f^+$ and $X_f^-$ values for a sequence of F frames, let $$X^+=\max\{X_f^+ | f=1, \ldots, F\},$$

$$X^-=\max\{X_f^- | f=1, \ldots, F\}.$$

Then, the parameters of the non-linear quantizer may be set for the whole scene as $$\text{Offset} = (2^{EL\_bitdepth} - 1)\frac{X^-}{X^- + X^+},$$

$$\text{Level} = \max\{2^{EL\_bitdepth} - 1) - \text{Offset}, \text{Offset}\},$$

and $$X_{MAX} = (1 + \Delta)\max\{X^-, X^+\},$$

where EL_bitdepth denotes the bit-depth of EL encoder (160) (e.g., EL_bitdepth=8) and $\Delta$ denotes a small positive value (e.g., $\Delta$=0.1). In an embodiment, for the chroma components, the number of quantization levels may be determined using $$\text{Chroma\_Level} = \min\left\{\text{Luma\_level}\frac{X_{MAX}(\text{chroma})}{X_{MAX}(\text{luma})}, 2^{EL\_bitdepth} - 1\right\}.$$

In another embodiment, the $X_f^+$ and $X_f^-$ values may also be replaced by the corresponding $Th_f+$ and $Th_f-$ values, as computed earlier.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to coding UHD EDR signals, such as those described herein. The computer and/or IC may compute any of a variety of parameters or values that relate to coding UHD EDR signals as described herein. The encoding and decoding embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to coding UHD EDR signals as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like.

The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to backward-compatible coding and decoding of UHD EDR signals are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for encoding input video data in a backward-compatible layered stream, the method comprising:
   accessing a first signal with a first spatial resolution and a first dynamic range;
   accessing a second signal with a second spatial resolution and a second dynamic range, wherein the second dynamic range is lower than the first dynamic range;
   in response to the second signal, generating with a processor a base layer signal with a preferred coding color format;
   in response to the first signal, generating with the processor a reference prediction signal with the second spatial resolution, the first dynamic range, and the preferred coding color format;
   computing luma prediction coefficients for a luma predictor in response to luma pixel values of the reference prediction signal and luma pixel values of the base layer signal, and not to chroma pixel values of the reference prediction signal or of the base layer signal;
   computing chroma prediction coefficients for a chroma predictor in response to both luma and chroma pixel values of the reference prediction signal and luma and chroma pixel values of the base layer signal;
   generating a predicted signal with the first dynamic range using the luma predictor and the chroma predictor in response to the base layer signal and the luma and chroma prediction coefficients;
   generating a residual signal in response to the first signal and the predicted signal, wherein generating the residual signal further comprises:
      up-scaling the predicted signal using an up-scaling process to generate an up-scaled predicted signal with the first spatial resolution; and
      generating the residual signal in response to the first signal and the up-scaled predicted signal, wherein generating the up-scaled predicted signal comprises:
         for one or more pixels in the predicted signal, applying luma thresholds and a selection criterion to select a luminance sub-range of corresponding pixel in the second signal; and
         applying to said one or more pixels in the predicted signal an up-scaling filter determined for said luminance sub-range to generate corresponding pixel values for the up-scaled predicted signal;
   generating a coded base layer stream using a base layer encoder in response to the base layer signal; and
   generating a coded enhancement layer stream using an enhancement layer encoder in response to the residual signal.

2. The method of claim 1 wherein the first spatial resolution is an ultra-high definition (UHD) resolution and the second spatial resolution is a high definition (HD) spatial resolution.

3. The method of claim 1 wherein the first dynamic range is a high or enhanced dynamic range and the second dynamic range is a standard dynamic range.

4. The method of claim 1 wherein the preferred coding color format comprises a YCbCr 4:2:0 format.

5. The method of claim 1 wherein the luma predictor comprises a polynomial predictor, where pixel values of a luma component of a predicted signal are predicted based only on luma pixel values of an input signal.

6. The method of claim 1 wherein the chroma predictor comprises a multi-color channel multiple regression (MMR) predictor, wherein pixel values of a chroma component of a predicted signal are predicted based on both luma and chroma pixel values of an input signal.

7. The method of claim 1 further comprising processing the residual signal by a non-linear quantizer before generating the coded enhancement layer stream.

8. The method of claim 1 further comprising generating metadata in response to the luma prediction coefficients and the chroma prediction coefficients and transmitting the metadata to a decoder.

9. The method of claim 1, further comprising signaling the luma thresholds and information related to the up-scaling filter for said luminance sub-range to a decoder.

10. The method of claim 1, wherein the first spatial resolution is the same as the second spatial resolution.

11. The method of claim 1, further comprising a pre-processing method to pre-process residual pixel data in an enhancement layer of the backward-compatible layered stream, the pre-processing method comprising:
   accessing residual pixel values in a residual picture frame, the residual pixel values to be processed by a non-linear quantizer;
   computing one or more smoothness metric values for one or more residual pixels in the residual picture frame; and
   setting to a predetermined value the pixels values of the one or more residual pixels for which their corresponding smoothness metric value is smaller than a threshold.

12. The method of claim 11, wherein the pre-processing method further comprises:
   sorting in decreasing order the computed one or more smoothness metric values to generate a list of sorted smoothness metric values; and
   selecting one of the smoothness metric values as the threshold.

13. The method of claim 11, wherein the smoothness metric value for a residual pixel is computed based on the standard deviation of pixel values in a region surrounding the residual pixel.

14. An apparatus comprising a processor and configured to perform the method recited in claim 1.

15. A non-transitory computer-readable storage medium having stored thereon computer-executable instructions for executing a method with one or more processors in accordance with claim 1.

* * * * *